Jan. 24, 1967  H. J. SCHLAFLY  3,299,534
DATA RECORDER, RESPONDER AND TEACHING SYSTEM
Filed Dec. 9, 1964  6 Sheets-Sheet 1

INVENTOR.
Hubert J. Schlafly,
BY
Paul & Paul
ATTORNEYS.

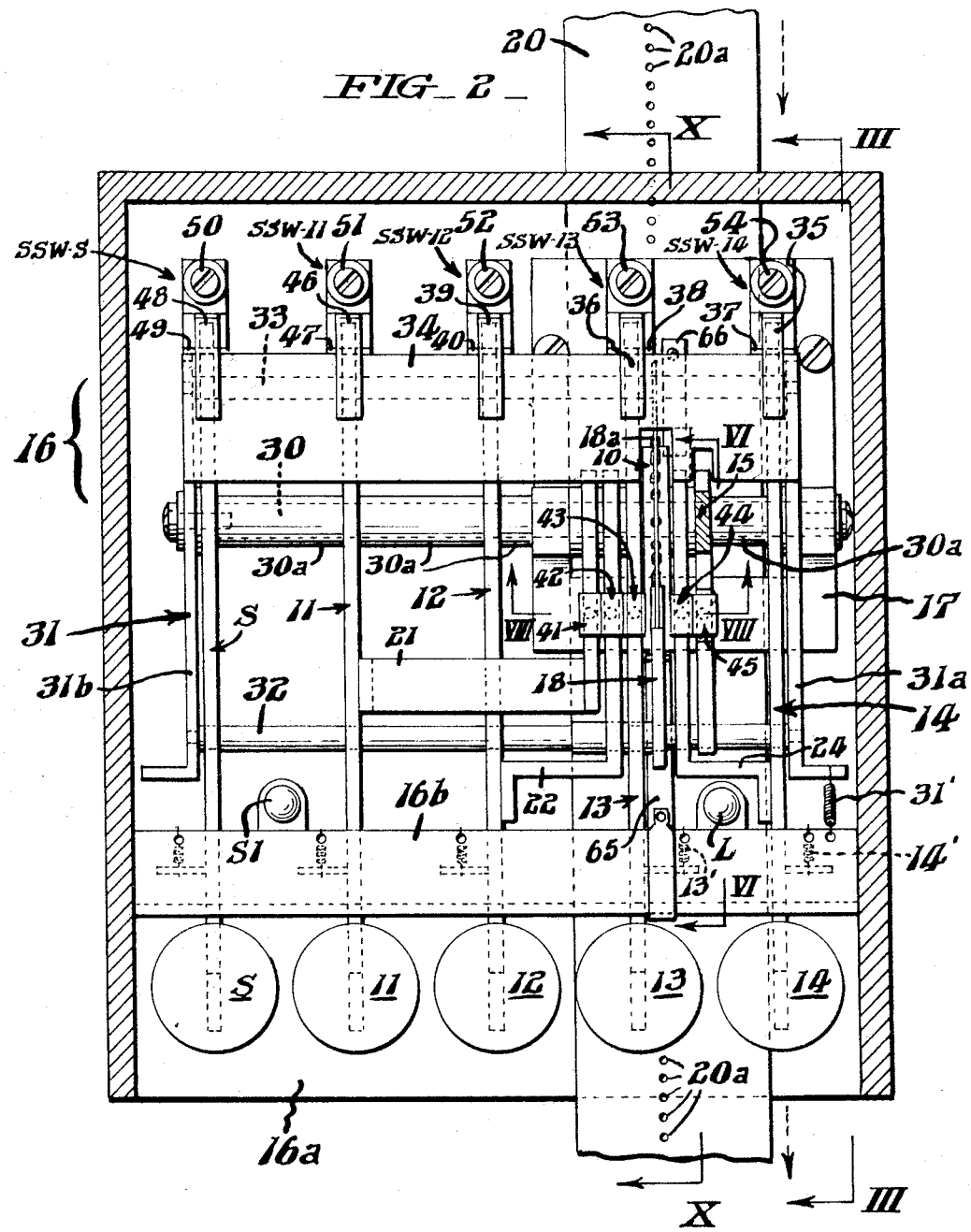

Jan. 24, 1967   H. J. SCHLAFLY   3,299,534
DATA RECORDER, RESPONDER AND TEACHING SYSTEM
Filed Dec. 9, 1964   6 Sheets-Sheet 2
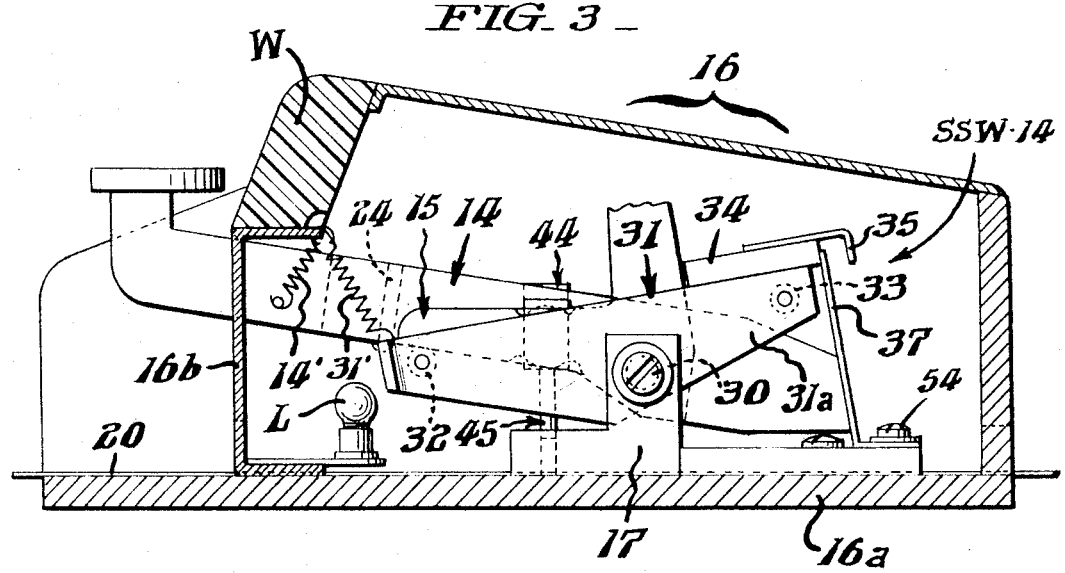
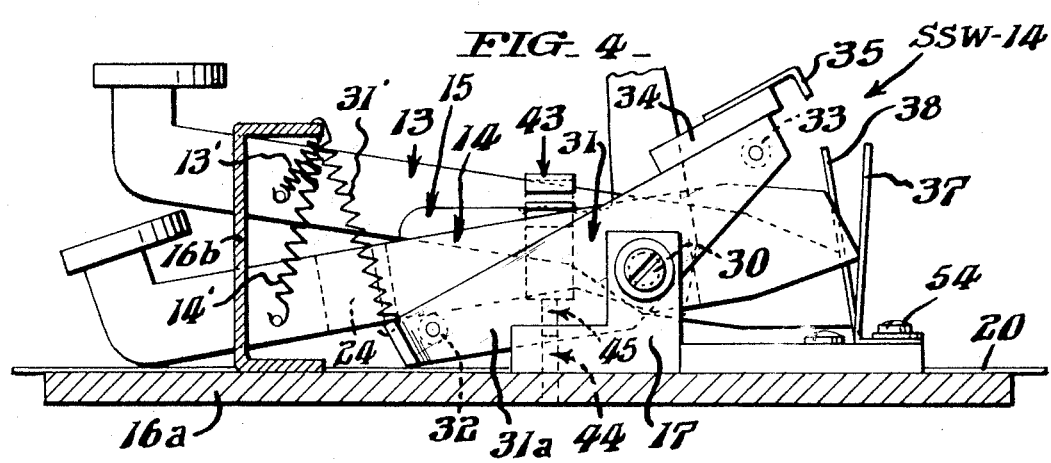
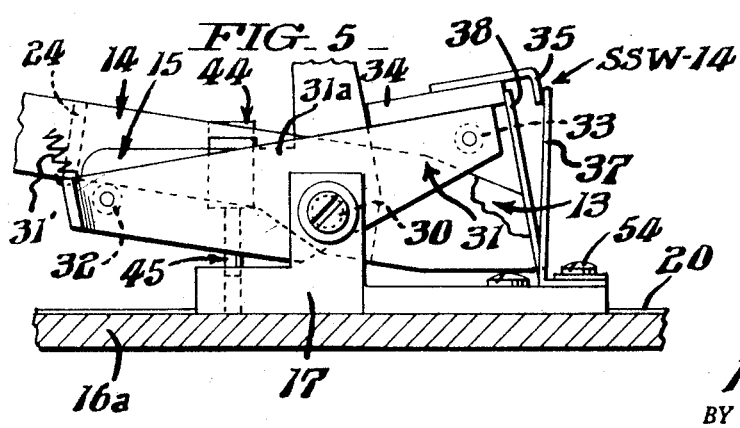
INVENTOR.
Hubert J. Schlafly,
BY
Paul & Paul
ATTORNEYS.

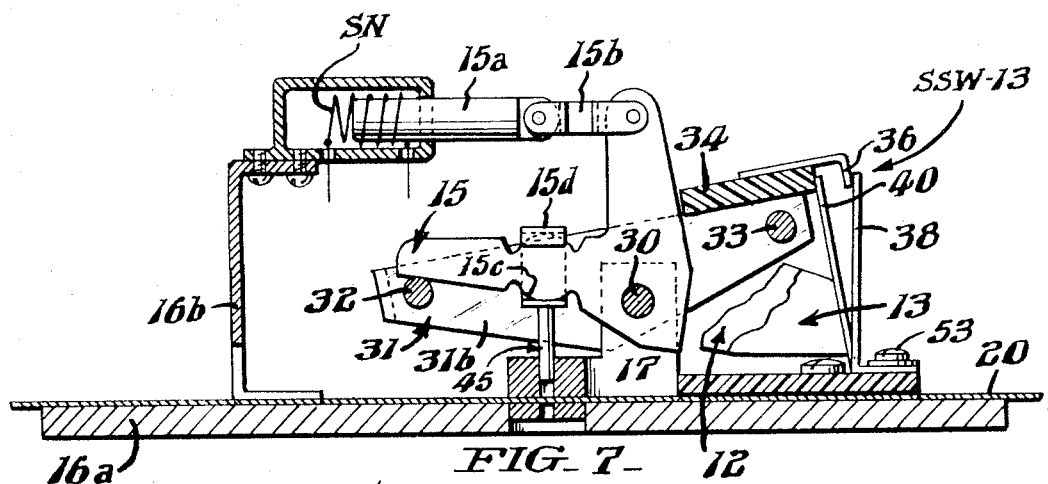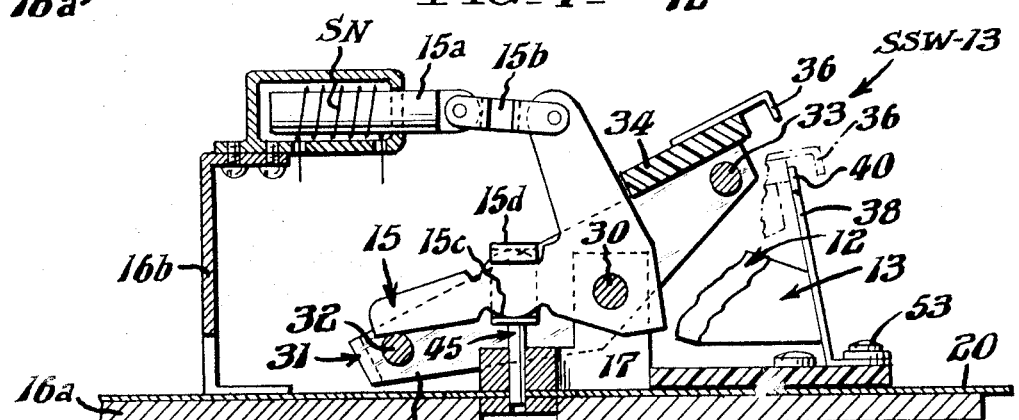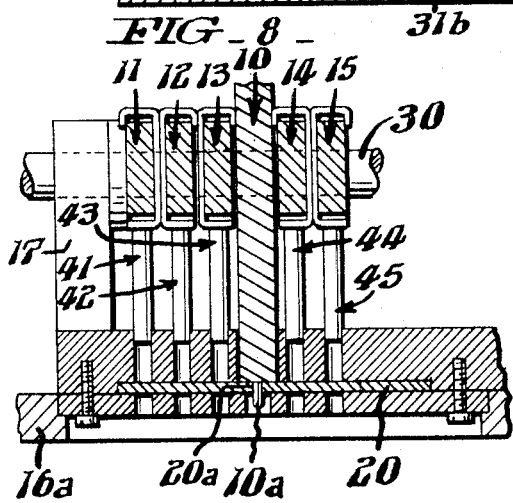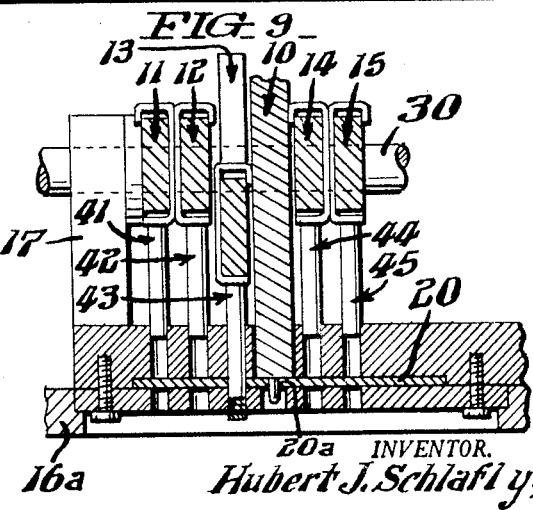

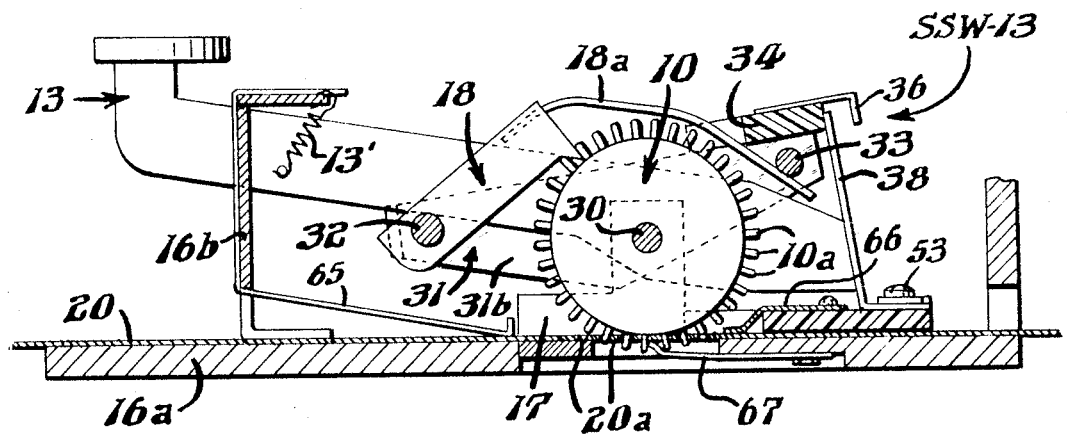
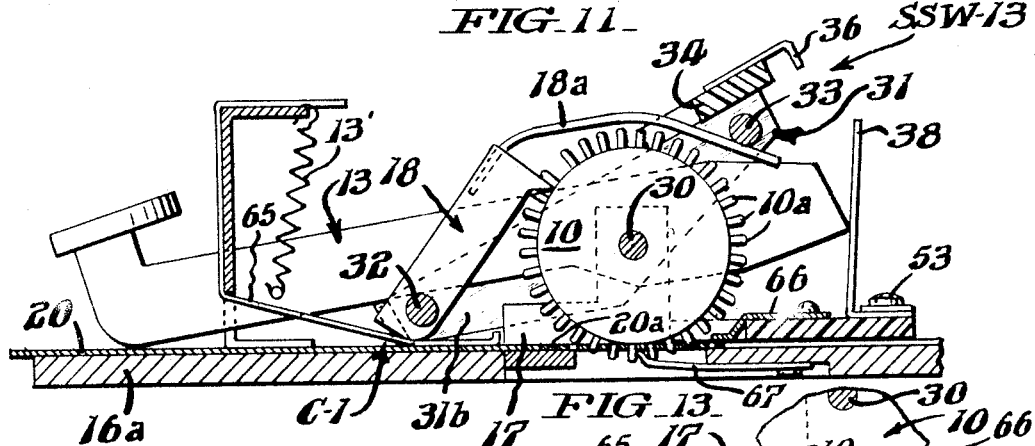
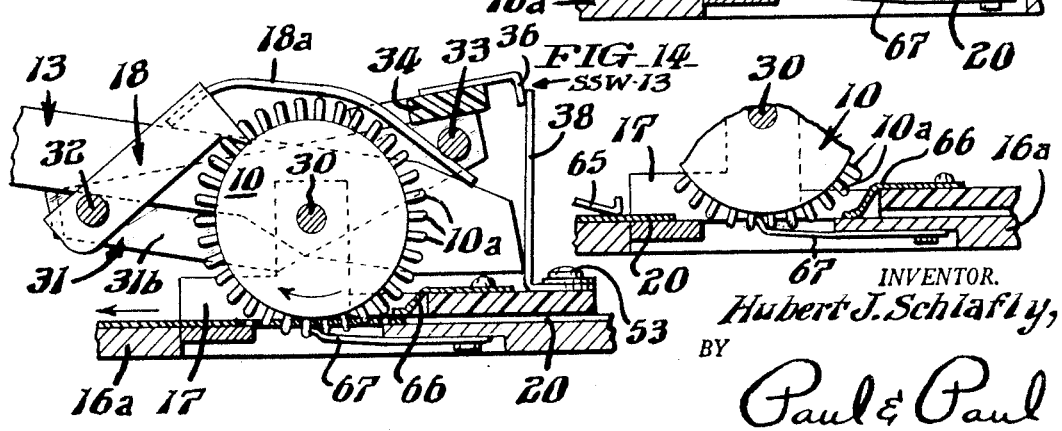

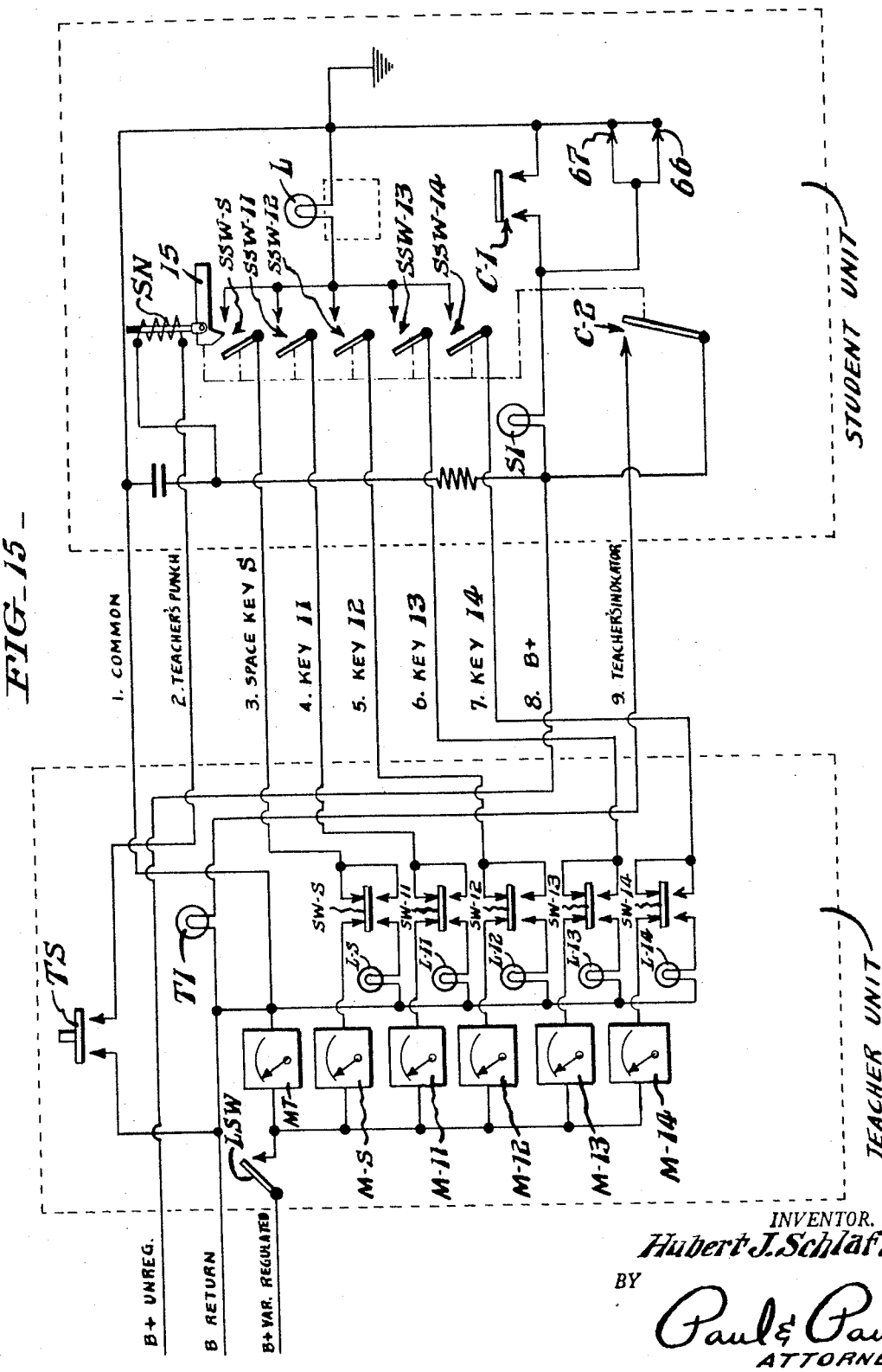

United States Patent Office 3,299,534
Patented Jan. 24, 1967

3,299,534
DATA RECORDER RESPONDER AND
TEACHING SYSTEM
Hubert J. Schlafly, Fort Lee, N.J., assignor to Tele-Pro Industries Incorporated, Cherry Hill, N.J., a corporation of New Jersey
Filed Dec. 9, 1964, Ser. No. 417,190
3 Claims. (Cl. 35—9)

This invention relates generally to data recorder mechanisms and more particularly to punch-tape mechanisms for the manual preparation of business or teaching data. Within this field the present invention relates also to mechanical aids for instantaneous teacher-student communications with simultaneous preparation of a permanent record of responses in the form of punched paper tape as used in conventional data processing and communication devices. The teaching system aspect of the present invention relates particularly to a combination of mechanisms, including a student-operated responder, a control device operatively connected with the student responder and a system comprising in combination a teacher control device and a plurality of student responders operatively connected thereto.

Various devices and mechanisms have been proposed in the past for recording data in the form of a punched tape. However, such devices have in the past either been unreliable and inaccurate when subject to constant use or have been extremely complicated, cumbersome and expensive. One of the objects of the present invention is to provide a punch-tape mechanism which is positive and accurate in operation and at the same time sufficiently simple in construction to provide a punch-tape unit which is both portable and relatively inexpensive.

Punch-tape mechanisms have been suggested in the prior art for use in the teaching field. For instance, various forms of mechanical devices for use in teaching based upon student selection of multiple choice answers have been heretofore proposed. However, the devices of the prior art have either been too elaborate and expensive or have lacked such features as direct and positive operation of each response device either by the teacher or by the student, automatic advance from one answer to the next, the capability of automatically providing a permanent response record for each individual student or means for achieving instantaneous two-way communication between each student and the teacher.

Consequently a further object of the present invention is to provide a student operable responder capable of indicating and recording each answer selected and simultaneously advancing the responder mechanism and its tape to a position for indicating and recording the next successive answer.

A further object of the present invention is to provide a teacher control device adapted to communicate with the student responder to punch separate holes in the responder tape and to advance the responder mechanism to a position for the next successive answer on actuation by the teacher.

A still further object of the present invention is to provide a teaching system comprising in combination a teacher control device and a plurality of student responders operatively interconnected.

A still further object of the present invention is to provide a teaching system comprising a combination including a teacher control device and student responders together with means incorporated in the teacher control device for displaying to the teacher the individual and collective operation of the student responders.

These and other objects and advantages, which will become apparent hereinafter, are achieved by the apparatus of the present invention.

The basic teaching equipment which can be installed in a classroom or other learning environment according to this invention is a teacher control unit electrically connected to preferably a plurality of student responder units. The design and operation of the units provide uniquely broad application with a simplicity of operation which requires no new or special skills for adaptation to individual data recording or teaching techniques. Likewise, the units are uncomplicated in operation and, therefore, have great usefulness in industry or in the grades and fields of advanced work.

The basic data recorder of the present invention is referred to herein as a multiple choice responder and is provided with a plurality of keys. Activation of the keys punches and advances a multi-channel paper tape through the responder. When incorporated in the present teaching system, the recorder simultaneously indicates by selective switching and circuit means the individual selection or response. The punched perforations produced in the tape permanently record the selection or response. For evaluation of extensive questioning or of testing, the punched tape can be manually processed or can be processed by conventional means for correction and scoring, thereby providing for a convenient permanent record of student achievement. This tape-punching function can be employed in conjunction with the teacher control unit through communication means for achieving certain desirable teach-student criteria in particular learning situations, or independently as a convenient means for obtaining student responses in a form which is adaptable for modern high speed evaluation.

Referring now to the drawings:

FIGURE 2 is a plan sectional view taken generally along the lines and arrows II—II of FIGURE 1 with parts shown in elevation.

FIGURE 3 is a cross-sectional view taken generally along the lines and arrows III—III of FIGURE 2 with parts shown in elevation.

FIGURE 4 is a fragmentary view similar to FIGURE 3 with some of the working parts displaced from their FIGURE 3 positions.

FIGURE 5 is a fragmentary view of FIGURE 3 showing some of the working parts displaced from their FIGURE 4 positions during the operation of the recording or responder unit.

FIGURE 6 is a fragmentary sectional view taken generally along the lines and arrows VI—VI of FIGURE 2 schematically showing a solenoid connected to the teacher's control unit.

FIGURE 7 is a fragmentary sectional view similar to FIGURE 6 showing the solenoid and connected parts in their actuated positions.

FIGURE 8 is a fragmentary sectional view taken along the lines and arrows VIII—VIII of FIGURE 2 of the tape-punching means.

FIGURE 9 is a fragmentary sectional view similar to FIGURE 8 showing one of the punching means in its operative position.

FIGURE 10 is a fragmentary view, partly in section and partly in elevation, taken generally along the lines and arrows X—X of FIGURE 2.

FIGURES 11 and 12 are views similar to FIGURE 10 showing the tape advancing means and the contact switch and release mechanisms at different positions of the operation key.

FIGURES 13 and 14 are fragmentary sectional views similar to FIGURE 10 showing the relative positions of the tape-sensing electrical contacts.

FIGURE 15 is a schematic electrical diagram of a student responder unit in combination with a teacher control unit.

Figure 1:
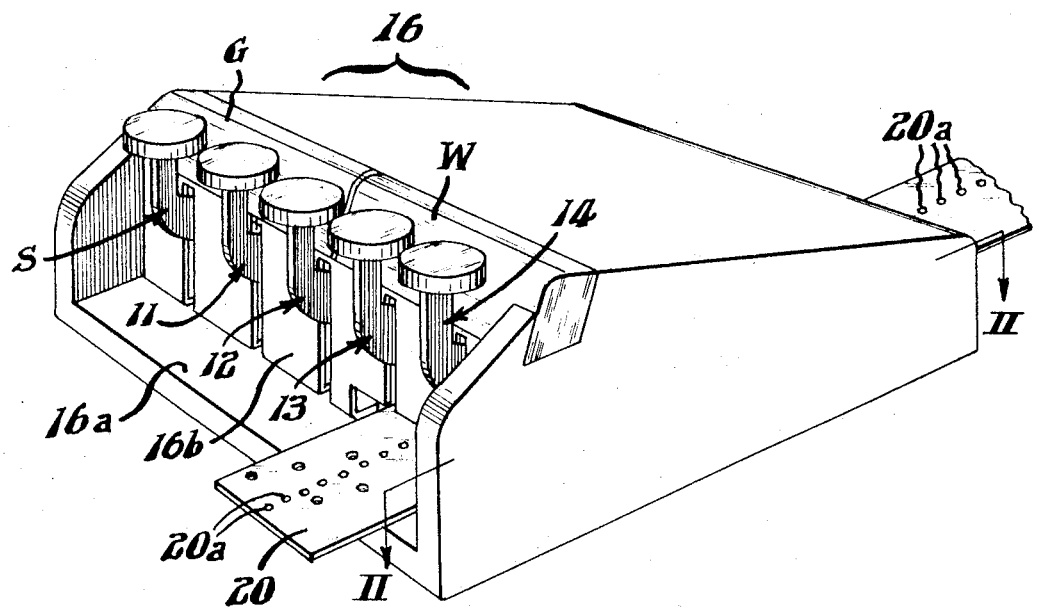
FIGURE 1 is a perspective illustration of a data recording unit showing the external punch actuating keys and a segment of multi-channel record tape inserted in the unit.

Referring now to FIGURES 1 to 5 inclusive of the drawings and considering the interrelated operation of each of the keys of the student responder, a case 16 enclosing the punching and selective electrical switching mechanisms of the responder contains a central pivot 30 supported by a mounting bracket 17 which is fastened to the floor 16a of case 16. Mounted to rotate through a limited arc about pivot 30 is key actuated lever 14 and a reaction cradle 31 with side members 31a and 31b. Cradle 31 is also provided with shafts 32 and 33 and a contact holder 34 carrying electrical contact 35. Punch 44, shown dotted, is fastened to an offset portion 24 of key lever 14 so as to move reciprocally down and up as key lever 14 is depressed and released. Spring 14' fastened to front plate 16b operates to return said lever 14 to its rest position. In FIGURE 4 as key lever 14 is depressed (exposing key lever 13 immediately behind), the lever 14 rotates about pivot 30 and engages shaft 32 thereby rotating cradle 31 about said pivot 30. In its original rest position, shown in FIGURE 3, key lever 14 engages electrical contact 37, which does not at this time make an electrical connection with contact 35. As lever 14 is depressed, it pushes electrical contact 37 in a direction generally away from pivot 30. Momentarily contact 37 catches on the inside surface of contact 35 but as cradle 31 moves further upward, contact 37 is freed to the position shown in FIGURE 4. As key lever 14 is released contact 37 springs back but is now captured by contact 35 as shown in FIGURE 5. By comparison, lever 13 in FIGURES 4 and 5, which has remained at rest, has permitted no electrical contact between its contact 38 and its respective contact on contact holder 34 carried by cradle 31 (see FIGURE 5). In this manner the operation of one key lever both activates its associated punch mechanism and electrical circuitry independently of any other key lever mechanism. Subsequent operation of any key lever other than key lever 14 will rock the cradle 31, release contact 37 from contact 35 and allow it to return to the position shown in FIGURE 3 when all keys are fully up (see FIGURE 1).

Another key lever operated function of the device is illustrated in FIGURES 10, 11 and 12. Tape advancing wheel 10 provided to rotate about its center on pivot 30 is rotated incrementally by a pawl 18 which is actuated every time cradle 31 is made to rock by the depression of one of keys S, 11, 12, 13 and 14 acting on cradle shaft 32 or by the teacher's lever 15 shown in FIGURES 6 and 7, the operation of which will be described later. Pawl 18 is pivotally attached to cradle member 32 and is provided with a holding spring 18a which bears upon cradle member 33 and urges engagement of pawl 18 with the protruding teeth 10a on wheel 10. Viewing the sequence of FIGURES 10, 11 and 12, as the cradle 31 is rocked by depression of any key lever, pawl 18 rotates the wheel 10 in a clockwise direction upon the return of the cradle to its normal position when the depressed key is released. This advances the record tape subsequent to the punching operation. Tape 20, shown partly in section in FIGURES 10, 11 and 12, is provided with perforations 20a, some of which are engaged by the wheel 10 at all times while the tape is operably in the unit. Rotation of the wheel 10 by the rocking of the cradle 31 to its normal position advances the tape a distance which is predetermined by the arc between adjacent teeth in the wheel. The rocking motion of cradle 31 is limited so that pawl 18 never engages more than one tooth position away from its original position.

Referring now to FIGURE 2, an exposed top view of a five-key recorder of the present invention adapted to operate as a student responder is shown. The pivot 30 and mounting bracket 17, viewed from the top, can be seen to support all five-key levers S, 11, 12, 13 and 14 (seen also in FIGURE 1). The levers may be spaced from each other by spacers 30a and are provided with offset portions 21, 22 and 24 in the case of levers 11, 12 and 14 respectively, which actuate punches 41, 42 and 44 respectively of FIGURES 8 and 9. Punch 45 (FIGURES 3, 8 and 9) is operated by the teacher's lever 15 in FIGURES 2, 6 and 7 in the embodiment shown, and punch 43 is actuated directly by key lever 13. Cradle 31 and shafts 32 and 33 are illustrated in their normal position as shown in FIGURE 3. Spring 31' is provided to return cradle 31 to its normal position after displacements such as in FIGURES 4 and 7. Punch tape 20 with its perforations 20a is illustrated in its operative position extending through the recorder case 16. Wheel 10, pawl 18 and spring 10a are also shown in FIGURE 2. Switch terminals 50, 51, 52, 53 and 54 are illustrated for connection of the selective switching contacts 35, 36, 37, 38, 39, 40, 46, 47 and 48, 49 to the desired circuitry.

The student responder unit which is illustrated here as a preferred embodiment of the recorder of the present invention, when incorporated in a teaching system, is designed to handle either five, seven or eight levels of standard punch tape. Although the teaching system embodiment shows a student capability of four punch positions, the S key being provided to advance the tape through the unit without punching the tape, the recording unit may be easily enlarged, consistent with the disclosure contained herein, to provide for as many punch positions as a given tape will handle. The present configuration was chosen solely for purposes of illustration. Furthermore, the paper punches might be placed on the side of pivot 30 opposite from the finger keys S, 11, 12, 13 and 14 so that pressing the key downward would actuate the punch upward and allow the paper tape to be at the top rather than at the bottom of the case 16. In this event the pawl 18 might be rotated to a different position around the periphery of sprocket wheel 10. Further, the means shown for allowing the operation of the key levers to make or break the electrical contacts 35, 37, etc. might be performed by another leaf spring and latching mechanism of a similar operating principle whereby depressing one lever closes the contact associated with that lever but releases any previously made contact associated with any other lever.

The student responder described is, therefore, capable of simple operation by a student when making a response to a multiple choice learning situation. This unit can be operated independently of electrical circuits to produce a permanent record of student responses which are incapable of alteration and adapted for high-speed evaluation. In addition, the multiple choice responder unit may be provided with internal circuitry which is well within the skill of an ordinary worker in the circuit art to design, which could take advantage of the unique selective switching capability of the responder by producing visual indication by colored lights or the like, of the student's response. Obviously this type of embodiment could be designed to be operated with or without taking advantage of the tape-punching capability of the unit.

Referring now to the teaching system comprising in combination a teacher control unit and student responder recording units, the schematic illustration of FIGURE 15 shows a preferred electrical circuitry arrangement.

The wiring interconnecting the teacher control unit and student units consists of nine basic low voltage conductors connecting in parallel the desired plurality of student responder units (only one is shown in FIGURE 15). Each key in the student responder is associated with a current read-out meter at the teacher control unit.

The common connector or bus is preferably coupled to a source of regulated low voltage D.C. current and is provided with a line switch LSW, a voltmeter MT and a series of direct reading current meters M–S, M–11, M–12, M–13 and M14. The MT meter reading can be adjusted (not shown) by the teacher so that the current meters will provide a direct indication of the number of students in the classroom. This will subsequently enable the teacher to obtain a direct readout of correct or incorrect student responses to a given question on the appropriate meter of the group. These meters M–S, M–11, etc. are coupled directly through four-pole push button switches SW–S, SW–11, SW–12, SW–13 and SW–14 to the selective switches SSW–S, SSW–11, SSW–12, SSW–13 and SSW–14 at each student responder unit corresponding to the numbering of the keys.

In the description relating to FIGURES 3, 4 and 5 it was pointed out that these switches are closed only when the corresponding key has been fully operated, and that the contact is broken by the subsequent operation of any other key. In this manner the student pressing and releasing key 11 will close SSW–11, thereby lighting the performance lamp L and producing a reading on meter M–11. Similarly, operation of key 11 in any other student responder which is parallel connected to this same circuit will draw an additional unit of current for its performance lamp, which will be additively indicated on meter M–11. Meter M–11 is preferably calibrated in units of lamp current to indicate the total number of students who have operated key 11 in one operating system. By means of SW–11 the teacher may interrupt the electrical circuit through meter M–11 and turn out all of the performance lamps L in those parallel connected responders where the student has closed switch SSW–11 by means of operating key 11. If performance lamp L has been energized by operation of any other key switch, for instance SSW–12, then lamp L will not be extinguished when the teacher presses switch SW–11. Thus the teacher may determine which group of students has operated any particular key. Lamp L does not have to be physically located at the student responder unit, but by extending its electrical connections might be made part of a display panel more readily available for teacher inspection. If any student has simultaneously operated more than one key, for example 11 and 12, both switches SSW–11 and SSW–12 might be closed, providing parallel current paths to the performance lamp L. This ambiguous condition is indicated to the teacher by means of warning lamp L–11, L–12, etc. associated with each meter. These lamps will light when the related interrogation switch SW–11, SW–12, etc. is operated only in the event that a student has provided a parallel path for the application of voltage across the terminals of L–11, L–12, etc. Where desired this response is also permanently recorded by the punch tape which has been pierced by the operation of the student's keys.

As shown in FIGURES 1, 2 and 3, the student's indicator lights L and SI are located below colored transparent or translucent panels G and W in the student recorder units. The student can, independently of the teacher, know that he has properly operated his student responder unit by the operation of the indicator lamp SI. When any key of any student recorder unit is fully depressed, as shown in FIGURE 11, the pawl 18 contacts the contact 65. This is schematically illustrated at C–1 of FIGURE 15. The lamp SI also serves as an indicator of whether paper tape is properly traveling through the student unit. When tape is not in the unit, contacts 66 and 67 of FIGURES 13 and 14 will respectively close the in and out circuits of FIGURE 15 permanently lighting the lamp SI until record tape is inserted into the unit and advanced between the contacts. Likewise the teacher can determine when any student is operating any key by the indicator lamp TI. This lamp is energized through switch C–2 which is closed as soon as any key is moved from its normal full up position.

If during the operation of the recorder units everything has proceeded as above, the teacher, in order to get a more meaningful record tape from each student, may wish to advance the tape in every student's recorder unit and mark the tapes by a punch perforation to indicate, for example, a new question or the passage of time. This is accomplished by means of the solenoid SN in FIGURE 15 operated by the teacher's switch TS which actuates the teacher's lever 15.

As shown in FIGURES 6 and 7, teacher's lever 15 is connected at its upper end to an armature 15a through a pivoted link 15b. Armature 15a is the movable element of solenoid SN which is supported on bracket 16b. Consequently, when solenoid SN is energized on closing switch TS, armature 15a is pulled to the left as shown in FIGURE 7 and lever 15 is rotated counterclockwise about pivot 30, causing lever 31 to rotate counterclockwise and also causing punch pin 45 to move downwardly into the record tape 20. Curved surface 15c is provided in lever 15 to provide a smooth downward motion for punch pin 45. Curved surface 15d provides a smooth upward motion for punch pin 45 when the armature 15a of solenoid SN returns to the position of FIGURE 6. By simultaneously marking a separate tape along with the students, the teacher can produce a master record tape against which all tapes may be subsequently compared by computer or other rapid evaluation means.

It is readily apparent from the foregoing description that the recorder unit of this invention may be used singly or in combination with a teacher control unit for accomplishing the objects of this invention. Of particular interest to administrative educational planners is the rugged construction of the student responder unit illustrated in FIGURE 1. This feature makes the unit particularly well suited for use in grades and classes where carelessness or vandalism might normally be a problem. In addiiton, the permanent record tape advancing and punching mechanism, while performing an important mechanical function in the operation of the student responder unit, is also psychologically useful in that the responding students have the feeling that by operating the keys in response to given stimuli they are actively participating as individuals in the class and are accomplishing something tangible in the form of the coded punch tape and in the operation of the indicator lights.

While this invention has been described with respect to specific embodiments thereof, it will be appreciated immediately by one of ordinary skill in this art that the teachings contained herein are capable of a wide variety of applications and modifications within the spirit of the invention and the scope of the appended claims. For instance, the recorder unit may be independently used either in teaching programs or for purposes other than in teaching, such as in taking inventory and recording various data for business purposes. The device also permits a multiple punch input so that binary combinations representing numerical or other coded data may be recorded. This makes it possible to provide a capability in excess of the physical number of student-operated input keys where the recorder is a part of a teaching system.

Having thus described my invention, I claim:

1. A plurality of multiple choice responders each electrically connected with a common control unit, said responders comprising a plurality of fingertip-operated response levers adapted to actuate means for punching and advancing multi-channel paper tape through the responder, each channel which is capable of being coded adapted to correspond to the response lever actuated, said response lever adapted to actuate selective switching means corresponding to the response lever actuated, said switching means being incorporated within electric circuit means operatively connecting said control unit to each of said responders and adapted to repeatedly and immediately provide intelligible information at the control unit as to responses originating at said plurality of responder units on actuation of said response levers, and switching means operative at the control unit to energize the tape punching and tape advancing means located at said responders.

2. The apparatus of claim 1 further characterized in that said control unit includes switching means to control the energization of electromechanical means located in each of the plurality of responders for punching and advancing said multi-channel tape independently of the activation of any of said responder levers, and further adapted with means communicating with each of the plurality of responders for selectively and repeatedly providing a coded display of the quality of all of the individual responses made.

3. A combination of a plurality of responder units and a control unit comprising in each responder unit a plurality of punch actuating keys, a plurality of electrical information channel means corresponding to said keys and provided to be actuated by the operation of said keys, said channel means adapted for connection to external evaluation means in said control unit, feedback means from said external evaluation means connected to evaluation display means located in each of said responder units, a tape transport mechanism for the movement of tape through said responder units mechanically advanced by said punch actuating keys, electrical sensing means and display means provided for determining that each responder unit is functioning, electromechanical means in each responder unit activated independently by switch means in said control unit and adapted to actuate the aforesaid tape transport mechanism and punch means for the advancement of the record tape through said responder unit and provided for punch programing of the record tape.

References Cited by the Examiner

UNITED STATES PATENTS

| | | | |
|---|---|---|---|
| 3,077,038 | 2/1963 | Williams | 35—9 |
| 3,095,653 | 7/1963 | Corrigan | 35—9 |
| 3,190,014 | 6/1965 | Rhodes | 35—48 |
| 3,214,847 | 11/1965 | Dorsett et al. | 35—9 |

EUGENE R. CAPOZIO, *Primary Examiner.*

S. M. BENDER, R. W. WEIG, *Assistant Examiners.*